(12) United States Patent  
Stretton et al.

(10) Patent No.: US 7,296,414 B2  
(45) Date of Patent: Nov. 20, 2007

(54) AIRCRAFT ENGINE MOUNTING ASSEMBLY

(75) Inventors: Richard G Stretton, Loughborough (GB); Peter K Beardsley, Derby (GB); David M Beaven, Nottingham (GB)

(73) Assignee: Rolls-Royce plc, London (GB)

( * ) Notice: Subject to any disclaimer, the term of this patent is extended or adjusted under 35 U.S.C. 154(b) by 282 days.

(21) Appl. No.: 10/954,277

(22) Filed: Oct. 1, 2004

(65) Prior Publication Data

US 2005/0081531 A1 Apr. 21, 2005

(30) Foreign Application Priority Data

Oct. 16, 2003 (GB) .................................. 0324259.1

(51) Int. Cl.
*B64D 27/00* (2006.01)
*F02K 3/02* (2006.01)

(52) U.S. Cl. ...................... 60/797; 60/226.1; 224/53 B

(58) Field of Classification Search .................. 60/796, 60/797, 226.1; 244/53 B
See application file for complete search history.

(56) References Cited

U.S. PATENT DOCUMENTS

| 3,997,134 A | | 12/1976 | Drakeley |
| 4,022,018 A | * | 5/1977 | Tuten et al. .................. 60/797 |
| 4,361,296 A | * | 11/1982 | Hall et al. ..................... 244/54 |
| 4,458,863 A | * | 7/1984 | Smith ........................ 244/53 B |
| 5,000,399 A | * | 3/1991 | Readnour et al. ......... 244/53 B |
| 5,372,338 A | | 12/1994 | Carlin |
| 6,892,526 B2 | * | 5/2005 | Stretton et al. ............ 60/226.1 |

* cited by examiner

*Primary Examiner*—Ted Kim
(74) *Attorney, Agent, or Firm*—W. Warren Taltavull; Manelli Denison & Selter PLLC

(57) ABSTRACT

A mounting assembly (10) for mounting a gas turbine engine on an aircraft. The assembly (10) comprising four equis-paced hydraulic piston and cylinder thrust links (16) connecting between the engine fan case (12) and the air intake (14), which intake (14) is mounted to the airframe.

23 Claims, 3 Drawing Sheets

AIRCRAFT ENGINE MOUNTING ASSEMBLY

FIELD OF INVENTION

This invention concerns a mounting assembly for a gas turbine engine on an aircraft, and also an aircraft including such an assembly.

BACKGROUND OF INVENTION

Aeroplane engines normally take thrust out into the airframe in two ways. Firstly, via the engine core either into a pylon or via thrust struts to the rear mount plane. Secondly, via a thrust trunnion on the fan case perpendicular to the engine access. With traditional under wing arrangements loads are taken rearwards through the engine or strut to the wing. With engines mounted towards the rear of the aeroplane matters can be more problematic as there is less airframe to receive thrust from the engine.

SUMMARY OF INVENTION

According to the present invention there is provided a mounting assembly for mounting a gas turbine engine on an aircraft, the assembly being mounted to an air intake such that thrust loads from the engine are borne by the air intake.

A thrust link is preferably provided between the fan case of the engine and the air intake. The thrust link is preferably configured to permit limited relative movement between the engine fan case and air intake.

The thrust link may be arranged to permit thrust produced by the engine to be measured.

Two or more discrete thrust links are preferably provided connecting between the fan case of the engine and the air intake. The thrust links are preferably substantially equispaced around the engine.

The thrust links may comprise a hydraulic piston and cylinder arrangement, with the cylinder mounted on either one of the engine fan case or air intake, and the free end of a piston rod mounted to the other of the engine fan case or air intake.

The piston rod may include a plurality of pivotally connected parts to permit relative pivotal movement thereof. The piston rod may be pivotally mounted to the piston and/or the other of the engine fan case or air intake.

In an alternative arrangement, the thrust link extends circumferentially around the engine fan case and the air intake.

The thrust link may include elastic load spreaders. The thrust link may include a pair of elastic load spreaders with a member connected to either one of the engine fan case and air intake located between the load spreaders, and a member connected to the other of the engine fan case and air intake located on each side of the load spreaders, to provide a sandwich configuration. The load spreaders may comprise pieces of elastomer.

The engine fan case and air intake may also be connected by a hinge, which hinge may be elastic. The hinge may extend circumferentially around the engine fan case and air intake.

The invention also provides an aircraft including one or more engine mounting assemblies according to any of the preceding nine paragraphs.

The air intake is preferably mounted to the airframe, and forms part of the main airframe structure.

BRIEF DESCRIPTION OF DRAWINGS

Embodiments of the present invention will now be described by way of example only and with reference to the accompanying drawings, in which.

DETAILED DESCRIPTION OF INVENTION

Figure 1:
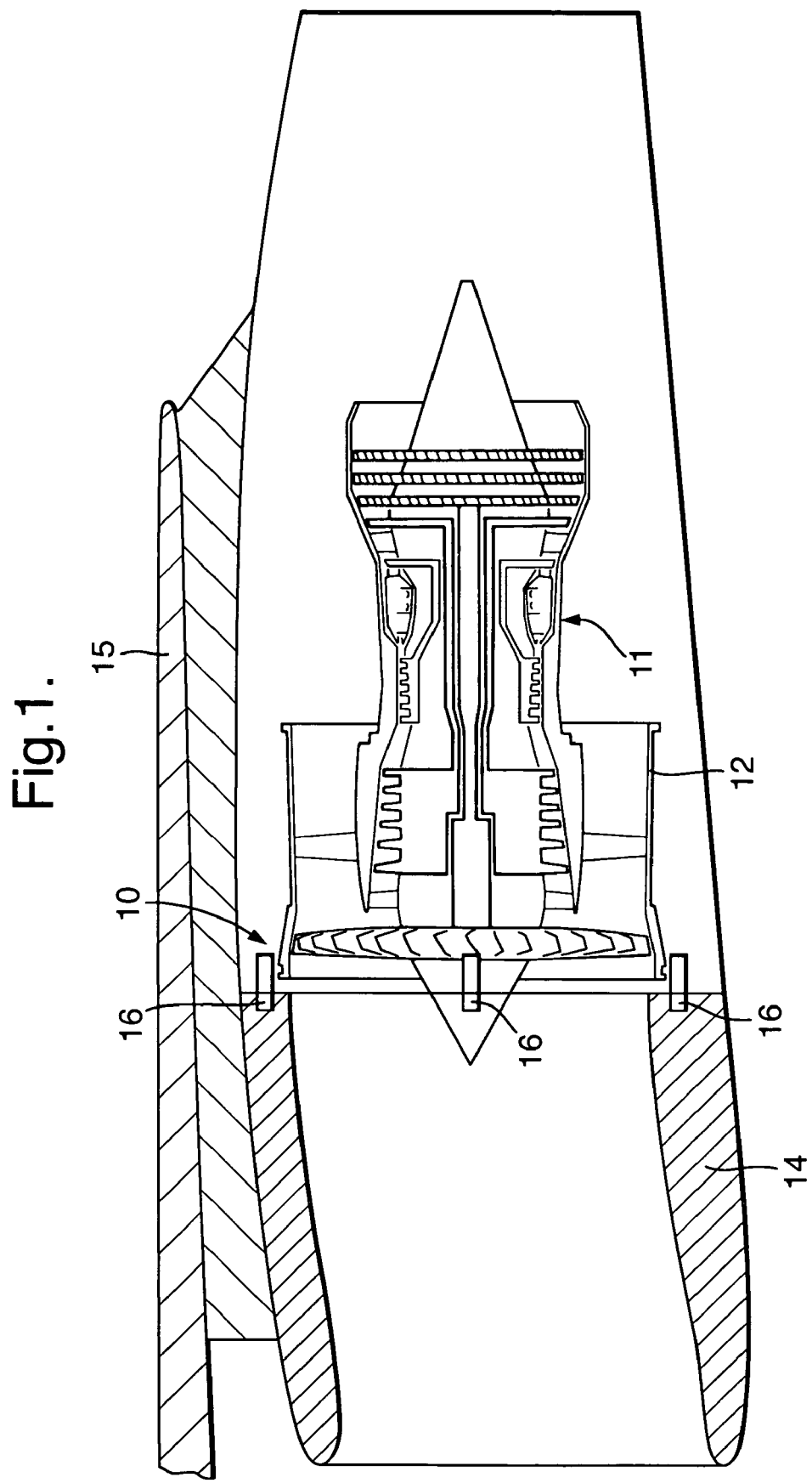
FIG. 1 is a diagrammatic side view of part of an aeroplane showing an engine mounting assembly according to the invention.
Figure 2:
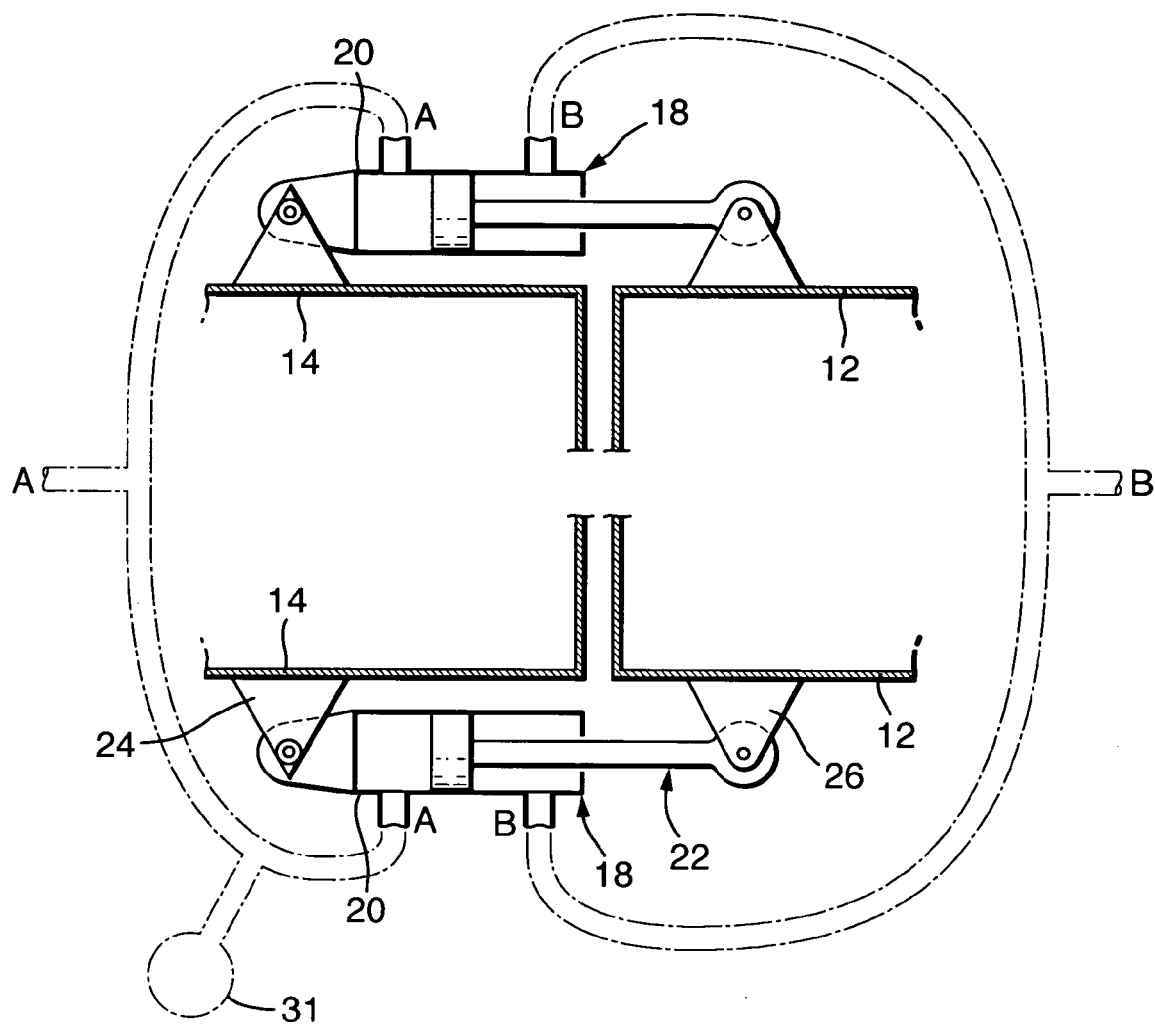
FIG. 2 is a schematic more detailed view of part of the assembly of FIG. 1.
Figure 3:
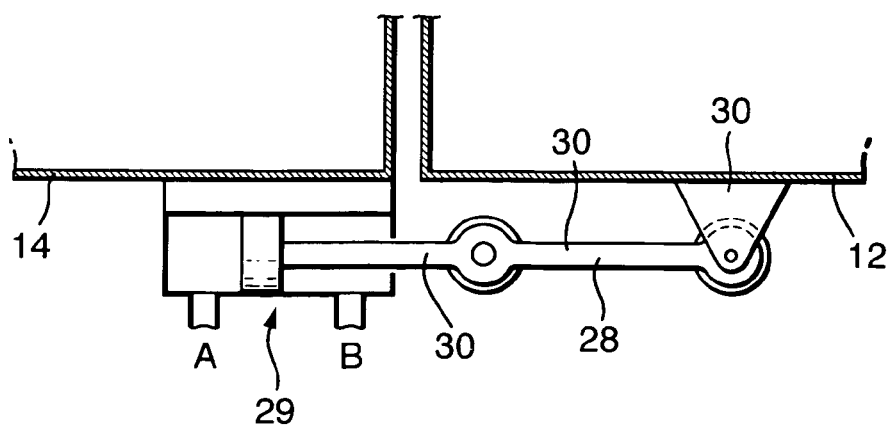
FIG. 3 is a schematic view of part of an alternative arrangement of an engine mounting assembly according to the invention.

FIGS. 1 to 3 show an engine mounting assembly 10 mounting a gas turbine engine 11 on an aircraft. The assembly 10 mounts the fan case 12 of the engine to the air intake 14. In this instance the air intake is mounted to the airframe structure 15 (shown cross hatched). The assembly 10 comprises four thrust links 16 circumferentially equispaced around the fan case 12 and intake 14, such that only three of the links 16 can be seen in FIG. 1.

Each link 16 comprises a double acting piston and cylinder arrangement 18 with a hydraulic cylinder 20 mounted on the intake 14. The pistons are hydraulically interconnected so as to evenly distribute the thrust (or pressure) loads. A piston rod 22 is pivotally mounted to the intake with a spherical bearing 24, and extends to a pivotal mounting 26 on the fan case 12. FIG. 2 shows two of the double acting pistons 20 which are configured to hydraulically connect all ports marked 'A' together, and all ports marked 'B' together, in order to evenly distribute the applied thrust load and thus minimize any engine casing distortion.

The main thrust loads are reacted by the larger piston face area (port A side) with the lower reverse thrust loads reacted by the smaller piston face area on the side of port B, to minimize system pressures. In the event of system failure (leakage) the piston would be configured to contact bump stops to limit the axial engine movement.

An alternative would be to use a single acting piston with port A interconnected to react forward thrust loads, and bump stops to react the lower reverse thrust loads.

FIG. 3 shows part of a similar arrangement 29 but where the piston rod 28 is formed of a number, in this instance three, pivotally connected parts 30. The assembly 10 can be used to measure thrust from the engine, and for instance a pressure transducer 31 could be connected in the circuit A.

In use, the thrust links 16 transmit axial loads from the engine to the intake 14 and hence into the airframe. The links 16 by virtue of the possible movement thereof compensate for movement and variations between the fan case 12 and intake 14.

Figure 4:
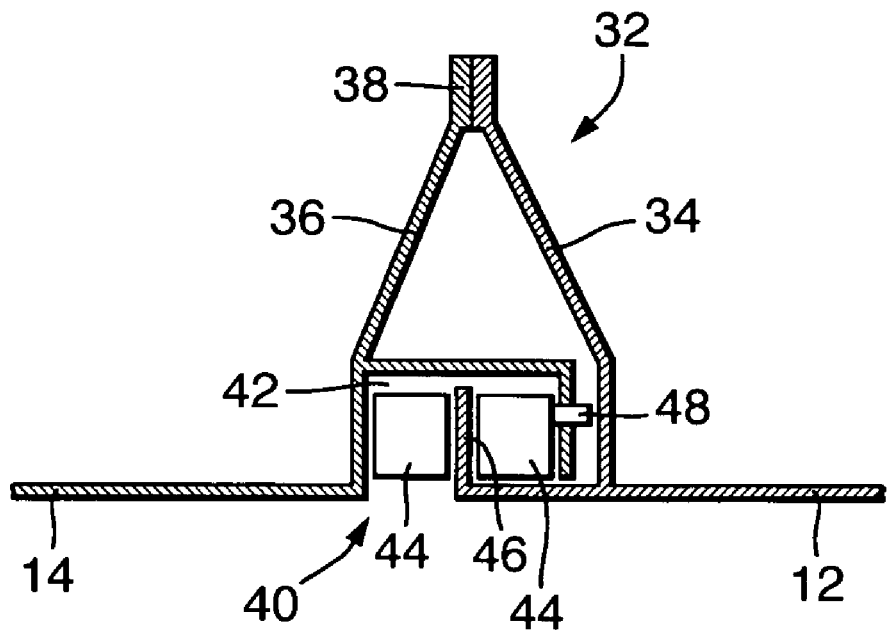
FIG. 4 is a diagrammatic cross sectional view through part of a second engine mounting assembly according to the invention.

FIG. 4 shows an alternative engine mounting assembly 32 in the form of a circumferential elastic hinge arrangement. Circumferential extensions 34, 36 from respectively the fan case 12 and intake 14 converge and are connected by an elastic hinge 38. A load spreading arrangement 40 is provided in the form of an inwardly facing channel 42 formed by part of the extension 36, which channel 42 locates two rings 44 of elastomer. A circumferential rim 46 extending from the fan case 12 locates between the rings 44.

In use, the hinge 38 and load spreading arrangement 40 permit relative movement between the fan case 12 and intake 14 and variations of alignment therebetween. The hinge 38 transmits side, vertical and torque loads. The load spreading arrangement 40 transmits thrust loads from the engine. If required a measuring arrangement 48 can be provided including for instance a part extending between one of the rings 44 and a side of the channel 42 to measure the engine thrust.

Figure 5:
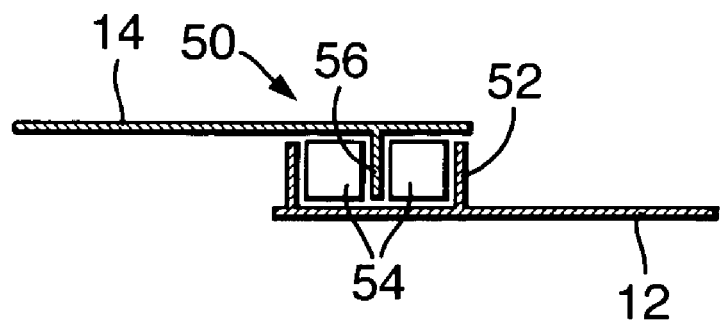
FIG. 5 is a similar view to FIG. 4 but of a third engine mounting assembly according to the invention.

FIG. 5 shows a third engine mounting assembly 50. In this instance an outwardly facing channel 52 is provided extending circumferentially around the forward end of the fan case 12. Located in the channel 52 are two rings 54 of elastomer. An inwardly extending rim 56 on the intake 14 locates between the rings 54. Respective compression or extension of the blocks 54 will permit limited relative movement or varied alignment between the fan case 12 and the intake 14. In use, the assembly 50 will transfer thrust loads from the fan case 12 to the intake 14. With such an arrangement it may well be that a separate torque link (not shown) will be provided on the fan case.

There are thus described engine mounting assemblies which permit thrust from an engine to be transferred via the fan case to the air intake and onto the airframe. This permits engines to be mounted where there is little structure to provide support therefore. The thrust links help prevent any bending moments induced by the thrust loads distorting the core of the engine which would otherwise detrimentally affect performance. This is because the thrust is taken out by the links in an axial symmetric way. The assemblies also permit thrust produced by the engine to readily be measured.

Various modifications may be made without departing from the scope of the invention. For instance, where there are discrete thrust links, a different number of these could be provided. Whilst the arrangements in FIGS. 4 and 5 have been described as continuous circumferential arrangements, such arrangements could be provided in a discrete equispaced number of arrangements as shown in FIGS. 1 to 3. Other means could be used for spreading the load, such as a toroidal oil filled chamber.

Whilst endeavoring in the foregoing specification to draw attention to those features of the invention believed to be of particular importance it should be understood that the Applicant claims protection in respect of any patent able feature or combination of features hereinbefore referred to and/or shown in the drawings whether or not particular emphasis has been placed thereon.

We claim:

1. A mounting assembly for mounting a gas turbine engine on an aircraft, characterized in that the assembly is mounted to an air intake mounted to an airframe structure such that thrust loads from the engine are borne by the air intake; wherein a thrust link configured to permit limited relative movement between an engine fan case and the air intake is provided between the fan case of the engine and the air intake.

2. An assembly according to claim 1, characterized in that the thrust link further comprises measuring means to permit thrust produced by the engine to be measured.

3. An assembly according to claim 1, characterized in that two or more discrete thrust links are provided connecting between the fan case of the engine and the air intake.

4. An assembly according to claim 3, characterized in that the thrust links are substantially equispaced around the engine.

5. An assembly according to claim 3, characterized in that the thrust links comprise a hydraulic piston and cylinder arrangement, with the cylinder mounted on either one of the engine fan case or air intake, and the free end of a piston rod mounted to the other of the engine fan case or air intake.

6. An assembly according to claim 5, characterized in that the piston rod includes a plurality of pivotally connected parts to permit relative pivotal movement thereof.

7. An assembly according to claim 5, characterized in that the piston rod is pivotally mounted to the piston and the other of the engine fan case or air intake.

8. An assembly according to claim 5, characterized in that the piston rod is pivotally mounted to the engine fan case.

9. An assembly according to claim 5 characterized in that the piston rod is pivotally mounted to the air intake.

10. An assembly according to claim 1, characterized in that the thrust link includes elastic load spreaders.

11. An assembly according to claim 10, characterized in that the thrust link includes a pair of elastic load spreaders with a member connected to either one of the engine fan case and air intake located between the load spreaders, and a member connected to the other of the engine fan case and air intake located on each side of the load spreaders, to provide a sandwich configuration.

12. An assembly according to claim 1, characterized in that the thrust link extends circumferentially around the engine fan case and the air intake.

13. An assembly according to claim 1, characterized in that the engine fan case and air intake are connected by a hinge, which hinge may be elastic.

14. An assembly according to claim 13, characterized in that the hinge extends circumferentially around the engine fan case and air intake.

15. A mounting assembly for mounting a gas turbine engine on an aircraft, characterized in that the assembly is mounted to an air intake mounted to an airframe structure such that thrust loads from the engine are borne by the air intake, wherein a thrust link is provided between an engine fan case and the air intake and configured to permit limited relative movement therebetween, and wherein the thrust link is arranged to permit thrust produced by the engine to be measured.

16. A mounting assembly for mounting a gas turbine engine on an aircraft, characterized in that the assembly is mounted to an air intake mounted to an airframe structure such that thrust loads from the engine are borne by the air intake, wherein two or more discrete thrust links are provided connecting between an engine fan case and the air intake and configured to permit limited relative movement therebetween.

17. An assembly according to claim 16, characterized in that the thrust links are substantially equispaced around the engine.

18. An assembly accordingly to claim 16 characterized in that the thrust links comprise a hydraulic piston and cylinder arrangement, with the cylinder mounted on either one of the engine fan case or air intake, and the free end of a piston rod mounted to the other of the engine fan case or air intake.

19. An assembly according to claim 18, characterized in that the piston rod is pivotally mounted to the piston and the other of the engine fan case or air intake.

20. An assembly according to claim 18, characterized in that the piston rod is pivotally mounted to the engine fan case.

21. An assembly according to claim 18, characterized in that the piston rod is pivotally mounted to the air intake.

22. An assembly according to claim 18, characterized in that the piston rod includes a plurality of pivotally connected parts to permit relative pivotal movement thereof.

23. An assembly according to any of claims 1, 15 or 16 characterized in that the air intake forms part of a main airframe structure.

* * * * *